United States Patent
Quraishi et al.

(10) Patent No.: US 11,954,653 B2
(45) Date of Patent: Apr. 9, 2024

(54) SENSOR-BASED AUTOMATIC DETECTION AND PRIORITIZATION OF MAINTENANCE ISSUES

(71) Applicant: 7-Eleven, Inc., Irving, TX (US)

(72) Inventors: Shahid Quraishi, Frisco, TX (US); Shahmeer Ali Mirza, Celina, TX (US); Matthew O'Daniel Redmond, Denton, TX (US); John Robert Keller, Plano, TX (US); Pirooz Najafi, Plano, TX (US)

(73) Assignee: 7-ELEVEN, INC., Irving, TX (US)

( * ) Notice: Subject to any disclaimer, the term of this patent is extended or adjusted under 35 U.S.C. 154(b) by 13 days.

(21) Appl. No.: 17/455,872

(22) Filed: Nov. 19, 2021

(65) Prior Publication Data
US 2023/0162160 A1    May 25, 2023

(51) Int. Cl.
*G06Q 10/06* (2023.01)
*G06Q 10/0631* (2023.01)
*G06Q 10/20* (2023.01)

(52) U.S. Cl.
CPC ....... *G06Q 10/20* (2013.01); *G06Q 10/06313* (2013.01)

(58) Field of Classification Search
None
See application file for complete search history.

(56) References Cited

U.S. PATENT DOCUMENTS

| | | | |
|---|---|---|---|
| 10,832,225 B1* | 11/2020 | Davis | G06F 11/0793 |
| 2022/0122204 A1* | 4/2022 | Ghosh | G06Q 50/163 |
| 2022/0230526 A1* | 7/2022 | Akatsuka | G05B 23/027 |

OTHER PUBLICATIONS

Kamat et al. (Anamoly Detection for Predictive Maintenance in Industry 4.0—A Survey, E3S Web Conf., vol. 170, 2020, 6th International Conference on Energy and City of the Future (EVF'2019), https://doi.org/10.1051/e3sconf/202017002007, May 28, 2020).*

* cited by examiner

*Primary Examiner* — Matthew D Henry
(74) *Attorney, Agent, or Firm* — Baker Botts L.L.P.

(57) ABSTRACT

A system includes first and second sensors, and a computing system. The first sensor measures a first property of a first piece of equipment, and the second sensor measures a second property of a second piece of equipment. The computing system includes a processor and memory, which stores a condition that depends on both the first property and the second property. Satisfaction of the condition indicates that maintenance of the first piece of equipment should be prioritized over maintenance of the second piece of equipment. The processor receives the measured first property and the measured second property. In response to determining, based on the measured first and second properties, that the third condition is satisfied, transmits an alert for display on a user device. The alert indicates that maintenance of the first piece of equipment has a higher priority than maintenance of the second piece of equipment.

20 Claims, 2 Drawing Sheets

SENSOR-BASED AUTOMATIC DETECTION AND PRIORITIZATION OF MAINTENANCE ISSUES

TECHNICAL FIELD

The present disclosure relates generally to sensors, and more specifically to a sensor-based automatic detection and prioritization of maintenance issues.

BACKGROUND

The physical locations associated with various entities often include a variety of different pieces of physical equipment and/or other physical objects that may require maintenance from time to time. For example, a convenience store may include beverage dispensers (e.g., fountain drink dispensers, coffee dispensers, milk dispensers, etc.) and associated cup dispensers that may need to be refilled, trash cans that may need to be emptied, refrigeration units that may break down and require fixing, and bathrooms that may need to be cleaned, among a variety of other examples. Such entities typically rely on workers to identify and address maintenance and/or servicing issues within the physical location of the entity. Ideally, such issues are identified and addressed prior to impacting any customers (e.g., cup dispensers are refilled prior to reaching an empty state, trash cans are emptied prior to overflowing, etc.). However, it is often difficult and/or time consuming to proactively monitor the physical equipment and/or other physical objects within a building for potential maintenance/servicing issues. Furthermore, employees may fail to prioritize identified maintenance/servicing issues in a manner that leads to the least customer impact and/or equipment damage.

SUMMARY

This disclosure contemplates an automatic monitoring system configured to monitor various pieces of equipment within a physical building, identify maintenance issues associated with such equipment, and transmit alerts that prioritize certain maintenance issues over others. Throughout this disclosure the term "maintenance issue" is used to refer to any issue associated with a physical object (e.g., piece of equipment), to which attention should be drawn. For example, a maintenance issue includes an issue associated with an equipment malfunction, an issue associated with equipment damage, an issue associated with routine servicing of equipment (e.g., cleaning equipment, refilling/replacing supplies associated with the equipment, etc.), and/or any other suitable issue to which attention should be drawn. Similarly, "maintenance" is used to refer to any action that may be taken to address an identified maintenance issue. For example, maintenance may include repairing damaged equipment, refilling/replacing supplies associated with the equipment, cleaning the equipment, and/or any other suitable action to address an identified maintenance issue.

The disclosed monitoring system includes a plurality of sensors, each of which is coupled to and/or otherwise associated with a piece of equipment within the physical building, and is configured to measure a property of the associated piece of equipment. Each sensor is configured to transit its measured properties to a computing system, which then uses the measured properties to identify maintenance issues. As an example, a sensor associated with a trash can (or trash compactor) may be configured to measure a property associated with a fill level of the trash can and to transmit the measured property to the computing system. The computing system may be configured to use this measured property to determine the fill level of the trash can. The computing system may then compare the fill level of the trash can to a threshold and determine that servicing should be performed on the trash can (e.g., the trash can should be emptied) when the fill level of the trash can is greater than the threshold. As another example, a sensor associated with a coffee cup dispenser may be configured to measure a property associated with a fill level of the cups within the cup dispenser, and to transmit the measured property to the computing system. The computing system may be configured to use this measured property to determine the fill level of the cup dispenser. The computing system may then compare the fill level of the cup dispenser to a threshold and determine that servicing should be performed on the cup dispenser (e.g., cups should be added to the cup dispenser) when the fill level of the cup dispenser is below the threshold.

When the computing system identifies multiple maintenance issues within a physical building, the system is configured to prioritize certain issues over others. As an example, the computing system may be configured to prioritize refilling a cup dispenser over emptying a trash can, when the cup dispenser is almost empty and the trash can is only 60% full. The computing system is then configured to transmit one or more alerts to the device of an employee within the building, alerting the employee to the maintenance issues, as well as the prioritization of certain maintenance issues over others. An embodiment of the system is described below.

According to an embodiment, a system includes a plurality of sensors, and a computing system communicatively coupled to the plurality of sensors. The plurality of sensors is located within a store. The store includes a set of equipment. The plurality of sensors includes a first sensor and a second sensor. The first sensor is associated with a first piece of equipment of the set of equipment. The first sensor is configured to measure a first property of the first piece of equipment and to transmit the measured first property over a network. The second sensor is associated with a second piece of equipment of the set of equipment. The second sensor is configured to measure a second property of the second piece of equipment and to transmit the measured second property over the network. The computing system includes a memory and a hardware processor communicatively coupled to the memory. The memory stores a plurality of conditions. Each condition is associated with at least one piece of equipment of the set of equipment. The plurality of conditions includes a first condition that depends on the first property of the first piece of equipment, wherein satisfaction of the first condition indicates that maintenance of the first piece of equipment is to be requested; a second condition that depends on the second property of the second piece of equipment, wherein satisfaction of the second condition indicates that maintenance of the second piece of equipment is to be requested; and a third condition that depends on both the first property of the first piece of equipment and the second property of the second piece of equipment, wherein satisfaction of the third condition indicates that maintenance of the first piece of equipment is to be prioritized over maintenance of the second piece of equipment. The hardware processor receives the measured first property from the network. The hardware processor also determines, based on the measured first property, that the first condition is satisfied. The hardware processor additionally receives the measured second property from the network. The hardware processor also determines, based on the measured second property, that the second condition is satisfied. In response to determining that the first condition is satisfied and that the second condition is satisfied, the hardware processor determines, based on the measured first property and the measured second property, that the third condition is satisfied. In response to determining that the third condition is satisfied, the hardware processor transmits an alert for display on a user device. The alert requests maintenance of the first piece of equipment and the second piece of equipment, and indicates that maintenance of the first piece of equipment has a higher priority than maintenance of the second piece of equipment.

The disclosed embodiments provide several practical applications and technical advantages. As an example, certain embodiments help to prevent equipment damage/failure, by prioritizing certain maintenance issues over others. As a specific example, while an empty state of a cup dispenser is unlikely to cause damage to the cup dispenser, an empty syrup bag attached to a beverage dispenser for an extended period time may wear out associated beverage dispenser pump. Accordingly, by prioritizing maintenance of the beverage dispenser over the cup dispenser, damage to the beverage dispenser may be avoided.

As another example, certain embodiments automatically cause an alert to appear on the screen of a user device, automatically cause the user device to generate a sound in response to receiving an alert, and/or automatically cause the user device to vibrate in response to receiving an alert. Accordingly, certain embodiments automatically inform a user of the alert, without requiring the user to repeatedly check his/her device to determine if an alert has been received, thereby conserving the computational resources otherwise expended during such actions. For example, certain embodiments automatically power on the device's screen and display the alert in a pop-up window, thereby automatically and efficiently displaying the alert to the user. This is in contrast to other monitoring systems in which a user may be required to (1) enter his/her passcode to unlock a device, (2) navigate to an application stored on the device, (3) open the application, and (4) navigate to monitoring data available through the application.

As a further example, certain embodiments of the system are configured to obtain alert thresholds for use with the equipment located within a physical building from similar, nearby buildings. For example, the system may be configured to obtain alert thresholds for one or more pieces of equipment belonging to an entity that has recently set up operations in a new building from one or more similar buildings (e.g., buildings operated by the same entity) that are located within a given radius of the new building, and to use the averages of these alert thresholds as the alert thresholds for use with the equipment located within the new building. In this manner, certain embodiments may help to increase the likelihood that maintenance issues associated with such thresholds are addresses prior to the issues impacting customers, while nevertheless avoiding the generation of unnecessary alerts (and the waste of computational resources associated with such unnecessary alerts).

Certain embodiments may include none, some, or all of the above technical advantages and practical applications. One or more other technical advantages and practical applications may be readily apparent to one skilled in the art from the figures, descriptions, and claims included herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
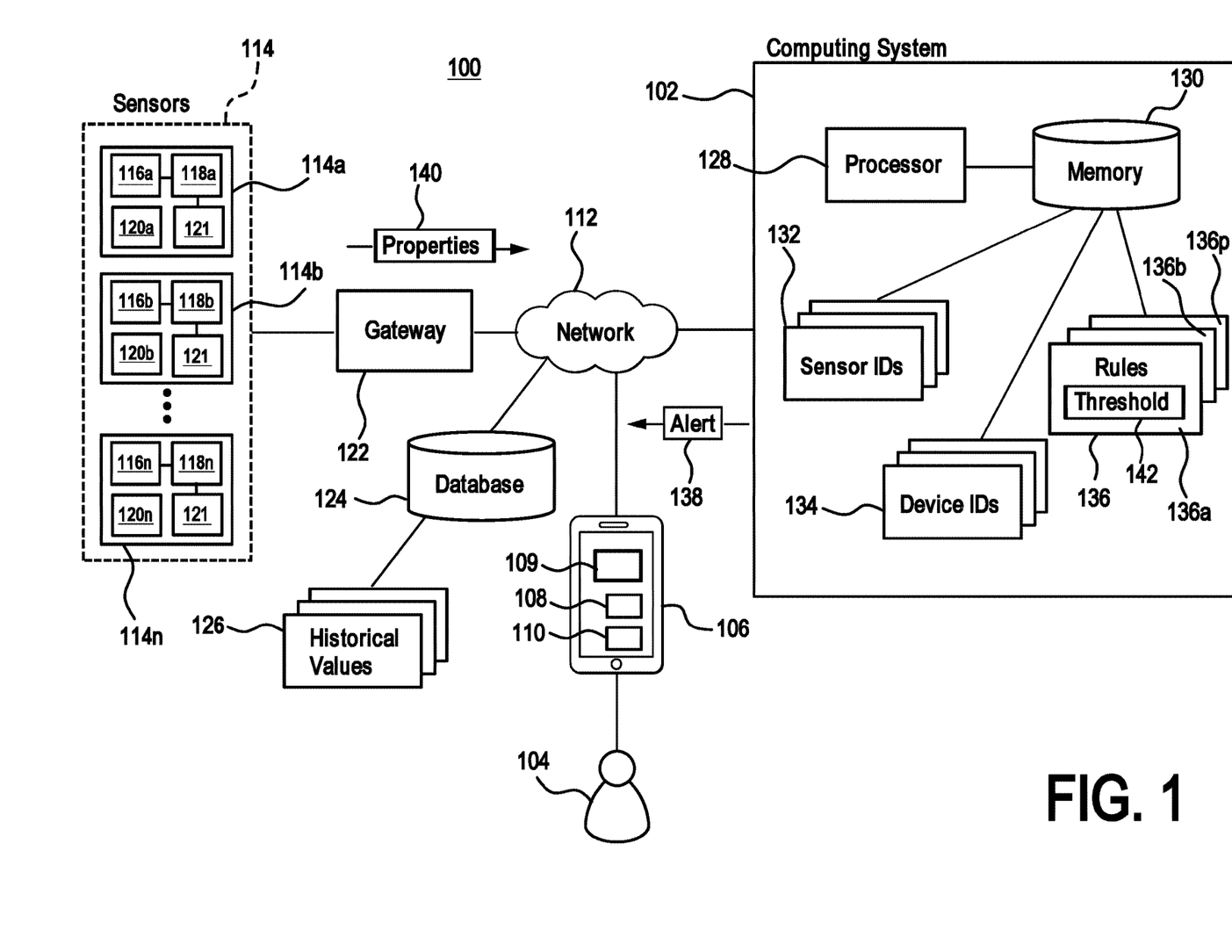
FIG. 1 is a schematic diagram of an automatic monitoring system, according to certain embodiments.
Figure 2:
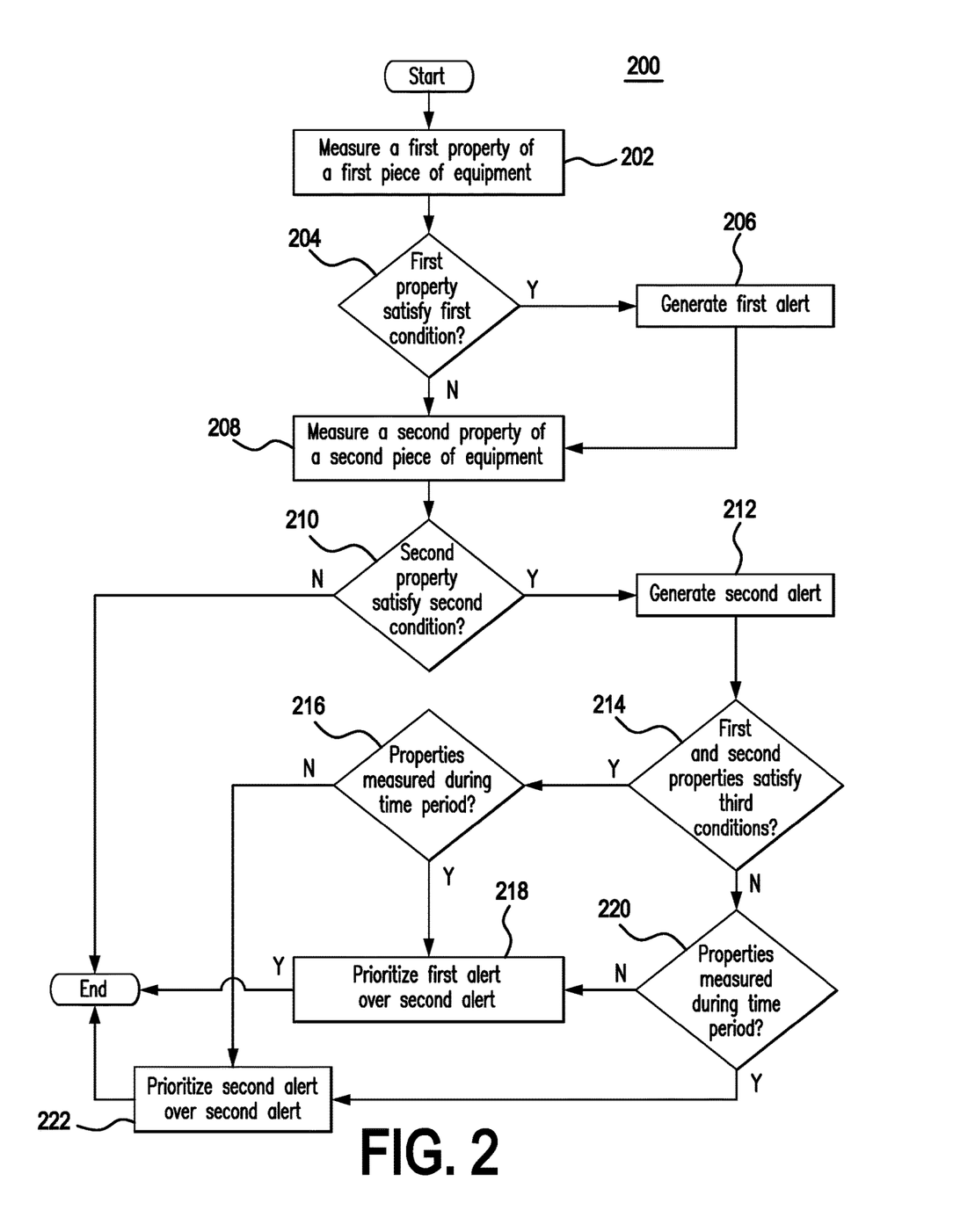
FIG. 2 illustrates a flowchart illustrating an example method by which the computing system of the automatic monitoring system of FIG. 1 uses a set of sensors to identify and prioritize maintenance issues within a physical building.

Embodiments of the present disclosure and its advantages are best understood by referring to FIGS. 1 through 2 of the drawings, like numerals being used for like and corresponding parts of the various drawings.

I. System Overview

FIG. 1 illustrates an example automatic monitoring system 100 that is designed to automatically monitor equipment within a physical building, and to alert a user device when maintenance issues associated with the equipment are identified. In this manner, certain embodiments of the system are able to automatically alert a worker when maintenance issues within a physical building arise, thereby increasing the likelihood that the worker is able to address the maintenance issues before they negatively impact customers within the building, without requiring the worker to proactively monitor each piece of equipment within the building. Furthermore, by prioritizing certain equipment maintenance issues over others (e.g., those maintenance issues that may result in damage to the associated equipment), certain embodiments help to prevent equipment damage/failure, by prioritizing certain maintenance issues over others.

As illustrated in FIG. 1, automatic monitoring system 100 includes computing system 102, user(s) 104, device(s) 106, network 112, sensors 114, gateway 122, and database 124. Each sensor 114a through 114n is associated with a piece of equipment located within a physical building. As used throughout this disclosure, "equipment" corresponds to any physical object for which a sensor configured to measure a property of the object may be associated. For example, "equipment" may include a trash can, a beverage dispenser, a cup dispenser, a coffee machine, a refrigerator, a toilet paper roll holder, a bathroom door, a window, a thermometer, and/or any other suitable object that may be housed within and/or may be a component of a physical building. Each sensor 114a through 114n is configured to measure a property of the piece of equipment with which it is associated, as described in further detail below. Sensors 114a through 114n are configured to transmit their measurements 140 directly or indirectly to computing device 102 using network 112 and/or gateway 122. Computing system 102 is configured to apply a set of rules 136 to the measured properties 140 to identify and prioritize maintenance issues for the equipment within the physical building, and to transmit alerts 138 identifying the prioritized maintenance issues to device 106, as described in further detail below.

Device(s) 106 are used by user(s) 104 (e.g., workers within a physical building housing equipment to which sensors 112 are coupled and/or otherwise associated) to communicate with computing system 102. As an example, user 104 may use device 106 to (1) receive an alert 138 from computing system 102 identifying one or more maintenance issues, and (2) display the alert to user 104. Device 106 may display alert 138 to user 104 in any suitable manner. For example, in certain embodiments, device 106 may generate a pop-up message that includes the alert, and automatically display the pop-up message on a screen of device 106. In some embodiments, device 106 may generate a sound and/or vibration in response to receiving alert 138. In certain embodiments, device 106 may display a graphical user interface (GUI) on a screen of device 106 within which the alert may be displayed. As further examples, in some embodiments, device 106 may receive alert 138 through an email and/or text message. After receiving the alert 138, user 104 may address the identified maintenance issue(s).

As another example, in certain embodiments, user 104 may use device 106 to display a dashboard 109 that is configured to display information associated with sensors 114 and/or the properties measured by sensors 114. For instance, in certain embodiments, dashboard 109 may be configured to display the historical values 126 of one or more of the properties measured by sensors 114 over a period of time (e.g., hours, days, years, etc.). In certain embodiments, the period of time over which the historical values of the properties are displayed within dashboard 109 may be adjustable by the user. In some embodiments, dashboard 109 may be configured to display identification information associated with one or more of sensors 114. For example, dashboard 109 may be configured to display the locations of one or more of sensors 114 superimposed on a layout of the physical building.

As a further example, in certain embodiments, user 104 may use device 106 to receive and display maintenance tickets 138 that were automatically generated by computing system 102. For instance, in response to receiving properties 140 measured by sensor 114 for a piece of equipment located within a physical building, computing system 102 may determine that the measured properties indicate that the physical equipment likely requires servicing. As a specific example, in certain embodiments, sensor 114a may correspond to an acoustic sensor configured to measure the sound generated by a motor associated with a given piece of equipment. Computing device 102 may be configured to receive the sound measured by the sensor and to determine, based on the received sound, that the motor is not functioning properly. Accordingly, computing device 102 may be configured to automatically generate a maintenance ticket 138, requesting that a technician service the equipment.

User device 106 is any appropriate device for communicating with components of computing system 102 over network 112, and notifying user 104 to an alert 138 received from computing system 102. For example, user device 106 may be a handheld computing device such as a smartphone, wearable computer glasses, a smartwatch, a tablet computer, a laptop computer, and the like. User device 106 may include an electronic display, a keypad, or other appropriate terminal equipment usable by user 104. For instance, the electronic display of user device 106 may be configured to display an alert 138 that is provided by remote computing system 102. In certain embodiments, the electronic display of user device 106 may be configured to display a dashboard 109 of the historical values 126 of the properties measured by sensors 114. In some embodiments, an application stored in a memory 108 of the device 106 and executed by a processor 110 of the device 106 may perform the functions described herein.

In certain embodiments, device(s) 106 may receive the properties 140 measured by sensors 114, apply a set of rules 136 to the measured properties 140 to identify and prioritize maintenance issues for the equipment within the physical building, and generate and display an alert 138 to user 104, identifying the prioritized maintenance issues. For example, in such embodiments, memory 110 of device 106 may include instructions (that are the same or similar to instructions 121) that, when executed by processor 108 of device 106, enable the device to perform the above tasks. Network 112 allows communication between and amongst the various components of system 100. For example, computing system 102, user device 106, and/or gateway 122 may communicate via network 112. This disclosure contemplates network 112 being any suitable network operable to facilitate communication between the components of system 100. Network 112 may include any interconnecting system capable of transmitting audio, video, signals, data, messages, or any combination of the preceding. Network 112 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

System 100 may include any number of sensors 114a through 114n. Each sensor 114 is associated with a piece of physical equipment located with a physical building. For example, one or more of sensors 114 may be coupled to a piece of physical equipment (e.g., a sensor 114 may be attached to a surface of the equipment, disposed within the equipment, or otherwise coupled to the equipment), located near a piece of physical equipment (e.g., a sensor configured to measure the fill level of a trash can may be positioned above the trash can), and/or otherwise associated with a piece of physical equipment.

Each sensor 114 may include a processor (e.g., one of processors 116a through 116n), a memory (e.g., one of memories 118a through 118n), and a radio (e.g., one of radios 124a through 124n). In general, each sensor 114 is configured to provide sensor data 140 to computing system 102. In certain embodiments, sensor data 140 corresponds to measured values for one or more properties associated with the physical equipment to which each sensor 114 is assigned. While FIG. 1 illustrates each sensor 114 as including its own processor 116, memory 118, and radio 120, in certain embodiments, two of more sensors 114 may be configured to share certain of these components. For example, in certain embodiments, two or more sensors 114 may be configured to monitor the same piece of physical equipment. For instance, a set of sensors 114 may be associated with a beverage dispenser, with each sensor of the set of sensors assigned to a different flavor of beverage available through the beverage dispenser. In certain such embodiments, the two or more sensors 114 that are configured to monitor the same piece of physical equipment may be coupled together into a single sensor device that may share one or more of processor 116, memory 118, and/or radio 120.

Each sensor 114 is configured for sensing or measuring a property associated with the piece of equipment to which the sensor is assigned. As an example, in certain embodiments, one or more of sensors 114 may be a time of flight (ToF) sensor that uses a laser to produce a beam of infrared light that is bounced off an object and returned to the sensor 114 in order to measure distance to the object. In such embodiments, each sensor 114 may include a laser diode that is configured to produce a laser beam that travels towards a surface, is then reflected off of the surface, and may travel back to the sensor where it is received by a photodetector included within the sensor. In certain such embodiments, sensor processor 116 may be configured to execute instructions 121 stored within sensor memory 118 to determine a distance measurement 140 based on a difference in time between production of the laser beam by the laser diode and reception of the reflected laser beam by the photodetector.

As another example, in some embodiments, one or more sensors 114 may correspond to ultrasonic sensors. For example, one or more sensors 114 may include a transducer configured to send and receive ultrasonic pulses. In particular, each such sensor 114 may be configured to emit a high-frequency sound pulse towards a surface, and to calculate a distance to that surface based on the time taken by the echo signal to travel back after reflecting from the surface.

As another example, in certain embodiments, one or more sensors 114 may correspond to pressure sensors. Such sensors 114 may be any suitable sensor configured for measuring an applied force per unit area. For example, one or more of such sensors 114 may correspond to a piezoresistive strain gauge sensor, a capacitive pressure sensor, an electromagnetic pressure sensor, a piezoelectric pressure sensor, a strain-gauge pressure sensor, and/or any other suitable type of pressure sensor. As further examples, in certain embodiments, one or more sensors 114 may correspond to a temperature sensor, a vibration sensor, a humidity sensor, and/or any other suitable sensor configured to measure a property associated with a piece of equipment within a building.

Additional examples of sensors 114 and the use of such sensors to measure properties associated with equipment may be found in co-pending applications.

Each sensor 114 is configured to provide measured properties 140, which are associated with a piece of equipment located within a physical building, to computing system 102. In some embodiments, one or more sensors 114 is configured to provide measured properties 140 automatically to computing system 102. For example, one or more sensors 114 may be configured to provide property measurements 140 to computing system 102 periodically (e.g., every five minutes), at random time intervals, and/or at any other suitable times. In some embodiments, one or more sensors 114 are configured to provide property measurements 140 to computing system 102 when requested to do so by the computing system.

One or more sensors 114 may be configured to operate in a manner that conserves power (e.g., battery power). For example, in some embodiments, one or more sensors 114 may remain in a low power consumption "sleep" mode for extended periods of time. While in sleep mode, sensor 114 may consume less power by reducing or avoiding using components such as radio 120. In these embodiments, sensor 114 may wake from the sleep mode after a predetermined amount of time (e.g., every five minutes), measure values for the properties associated with the physical equipment to which the sensor is assigned, transmit property measurements 140 to computing system 102 and/or gateway 122, and then return to sleep mode. As a result, embodiments of sensors 114 that use batteries for power may be able to operate for a longer duration of time before requiring new batteries.

In certain embodiments, one or more sensors 114 may operate as an Internet-of-Things (IoT) device. In general, IoT describes a network of physical objects (or "things") that are embedded with sensors, software, and other technologies for the purpose of connecting and exchanging data with other devices and systems over the internet. In embodiments where one or more sensors 114 is an IoT device, system 100 may include a gateway 122 for communicating with the sensors 114. Gateway 122 may be any appropriate IoT gateway, computer system, or electronic device that is capable of wirelessly communicating with one or more sensors 114 using any appropriate IoT communications protocol. For example, in certain embodiments, gateway 122 is a LoRaWAN gateway. Without limitations, the IoT communications protocol may include message queuing telemetry transport (MQTT), constrained application protocol (CoAP), advanced message queuing protocol (AMQP), data-distribution service (DDS), Zigbee, Z-Wave, lightweight machine-to-machine (LwM2M), or any combinations thereof. For example, one or more sensors 114 may wirelessly transmit property measurements 140 to gateway 122, and gateway 110 may in turn send distance measurement 136 to computing system 102 via network 108. In other embodiments, one or more of sensors 114 may not be an IoT sensor. In embodiments where one or more of sensors 114 is not operable as an IoT sensor, those one or more sensors 114 may transmit property measurements 140 directly to computer system 102 via network 112 (e.g., without using gateway 122).

Each sensor 114a through 114n uses its associated radio 120a through 120n to transmit property measurements 140. Each radio 120a through 120n is any transmitter or transceiver that is capable of wirelessly transmitting data. In some embodiments, for example, one or more of radios 120a through 120n is a Bluetooth transceiver. In these embodiments, property measurements 140 are transmitted via Bluetooth to gateway 122 and/or computing system 102. In some embodiments, one or more of radios 120a through 120n is a Wi-Fi transceiver and property measurements 140 are transmitted via Wi-Fi to gateway 122 and/or remote computing system 102.

Memory 118a through 118n of each sensor 114a through 114n may include any suitable set of instructions, logic, and/or code used by the sensor to perform the functions described herein. In particular embodiments, memory 118a through 118n may include a software application executable by the corresponding processor 116a through 116n of sensors 116a through 116n to perform one or more of the functions described herein.

While described above as providing property measurements 140 to gateway 122 and/or computing system 102, in certain embodiments, one or more of sensors 114a through 114n may be configured to perform one or more calculations on the property measurements they have obtained, and to transmit the results to gateway 122 and/or computing system 102. As a specific example, in certain embodiments in which sensor 114a corresponds to a time-of-flight sensor that is configured to measure a distance to the top of the garbage within a trash can, memory 118a may include instructions for converting the distance measurement into a measure of the fill level of the trash can (e.g., a percentage fullness of the trash can). As another specific example, in certain embodiments in which sensor 114b corresponds to a time-of-flight sensor that is configured to measure a distance within a cup dispenser from the last cup in the dispenser to the end of the dispenser, memory 118b may include instructions for converting the distance measurement into a measure of the fill level of the cup dispenser (e.g., a number of cups remaining within the cup dispenser, a percentage of the maximum number of cups housed within the cup dispenser that are remaining, etc.). In other embodiments, such calculations may be performed by computing system 102.

Computing system 102 may be any appropriate computing system in any suitable physical form. As example and not by way of limitation, computing system 102 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computing system 102 may include one or more computing systems 102; be unitary or distributed; span multiple locations; span multiple machines; span multiple data centers; or reside in a cloud, which may include one or more cloud components in one or more networks. Where appropriate, one or more computing systems 102 may perform without substantial spatial or temporal limitation one or more steps of one or more methods described or illustrated herein. As an example and not by way of limitation, one or more computing systems 102 may perform in real time or in batch mode one or more steps of one or more methods described or illustrated herein. One or more computing systems 102 may perform at different times or at different locations one or more steps of one or more methods described or illustrated herein, where appropriate. In some embodiments, computing system 102 includes an electronic display that may alternately or additionally display alert 138.

Computing system 102 may be physically located within the same physical building in which sensors 114a/b are located, or physically located at a location remote from the physical building in which sensors 114a/b are located. For example, in certain embodiments, computing system 102 may be located in one or more remote servers (e.g. in the cloud).

Processor 128 is any electronic circuitry, including, but not limited to a microprocessor, an application specific integrated circuits (ASIC), an application specific instruction set processor (ASIP), and/or a state machine, that communicatively couples to memory 130 and controls the operation of computing system 102. Processor 128 may be 8-bit, 16-bit, 32-bit, 64-bit or of any other suitable architecture. Processor 128 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 128 may include other hardware that operates software to control and process information. Processor 128 executes software stored in memory 130 to perform any of the functions described herein. Processor 128 controls the operation and administration of computing system 102 by processing information received from sensors 114, gateway 122, network 112, user device 106, and/or memory 130. Processor 128 may be a programmable logic device, a microcontroller, a microprocessor, any suitable processing device, or any suitable combination of the preceding. Processor 128 is not limited to a single processing device and may encompass multiple processing devices.

Memory 130 may store, either permanently or temporarily, data such as property measurements 140, user preferences, operational software, and/or other information for processor 128. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices.

In certain embodiments, memory 130 may also store sensor identifiers 132, device identifiers 134, and rules 136. Sensor identifiers 132 may include information used by computing system 102 to determine the sensor 114 from which a measured property 140 is received. For example, in certain embodiments, as part of the set-up processor for system 100, an identification number may be assigned to each sensor 114 that has been provisioned for use within the system. Sensor identifiers 132 may store each such identification number, along with a type of the sensor to which the identification number is assigned. In certain embodiments, sensor identifiers 132 may also store an entity identification number associated with each sensor identification number and identifying the physical building in which the sensor is located. In particular, while the above description described sensors 114 as located within the same physical building, in certain embodiments, computing system 102 may be configured to monitor equipment housed within multiple physical buildings. In such embodiments, an entity identification number may also be assigned to each physical building within which one or more of sensors 114 is located. In such embodiments, the information stored as sensor identifiers 132 in memory 130 may take the form: {Sensor ID, Entity ID, Sensor Type}. Each sensor 114 may be configured to transit its Sensor ID whenever it transmits sensor data 140 to computing system 102. In response to receiving sensor data 140, computing system 102 may be configured to extract the transmitted Sensor ID, and to use the Sensor ID to determine the physical building from which the sensor data 140 was transmitted (based on the Entity ID associated with the Sensor ID), and the type of sensor that transmitted the sensor data 140 (based on the Sensor Type associated with the Sensor ID). Computing system 102 may use these values to process the measured properties 140 received from the sensor 114, and to determine whether or not to transmit any alerts 138 based on the received properties.

Device identifiers 134 may include information used by computing system 102 to determine the user device 106 to which an alert 138 should be sent. For example, in certain embodiments, for each physical building in which one or more sensors 114 are located, device identifiers 134 may include an entry list identification numbers assigned to user device(s) 106 associated with that physical building. In such embodiments, the information stored as device identifiers 134 may take the form: {Entity ID, User Device ID}. In response to determining to transmit an alert 138 based on measured properties received from a given sensor 114a (associated with a given Sensor ID), computing system 102 may use the Entity ID associated with the given Sensor ID in the set of sensor identifiers 132, to determine the User Device ID assigned to a device 106 associated with the physical building (e.g., associated in memory 130 with the Entity ID assigned to the physical building). Computing system 102 may then use User Device ID to transmit alert 138 to the device 106 associated with the physical building.

Rules 136 are used by computing system 102 to (1) determine, based on measured properties 140 received from one or more sensors 114 associated with a given piece of equipment, whether to transmit an alert 138 associated with that piece of equipment to user device 106; and (2) prioritize alerts 138, when computing system 102 has determined that two or more alerts 138 should be transmitted to a given user device 106.

Rules 136 may take any suitable form. As an example, in certain embodiments, one or more rules 136 may correspond to thresholds 142 against which measured properties 140 and/or quantities derived from measured properties 140 are to be compared. As a specific example, in certain embodiments in which sensor 114*a* is a trash can sensor configured to measure a property associated with the fill level of the trash can, rule 136*a* may correspond to a rule that indicates that computing system 102 is to transmit an alert 138 to user device 106 if the fill level of the trash can rises above a given threshold 142. As another specific example, in certain embodiments in which sensor 114*b* is a coffee bean sensor configured to measure a property associated with a fill level of coffee beans used by a coffee machine, rule 136*b* may correspond to a rule that indicates that computing system 102 is to transmit an alert 138 to user device 106 if the fill level of the coffee beans falls below a specified threshold 142.

In certain embodiments, one or more rules 136 may include a set of thresholds 142, each of which may be associated with a different alert level. For example, the set of thresholds may include: (1) a first threshold (e.g., 50% capacity of coffee beans remaining, 50% of trash can full, etc.), which, if met, may trigger computing system 102 to generate an alert 138 associated with a low level of severity; (2) a second threshold (e.g., 20% capacity of coffee beans remaining, 75% of trash can full, etc.), which, if met, may trigger computing system 102 to generate an alert 138 associated with a medium level of severity; (3) a third threshold (e.g., 5% capacity of coffee beans remaining, 95% of trash can full, etc.), which, if met, may trigger computing system 102 to generate an alert 138 associated with a high level of severity; (4) a fourth threshold (e.g., 0% capacity of coffee beans remaining, 100% of trash can full, etc.), which, if met, may trigger computing system 102 to generate an alert 138 associated with a highest level of severity; and/or (5) any other suitable thresholds. Device 106 may be configured to communicate alerts 138 to user 104 in different manners, depending on the severity level associated with the alert. For example, depending on the severity of a received alert 138, device 106 may be configured to (1) display the alert within a graphical user interface accessible to user 104 through device 106; (2) automatically generate an display a pop-up window that displays the alert; (3) generate a sound and/or vibration; and/or (4) perform any other suitable action to draw user 104's attention to the alert.

In certain embodiments in which one or more rules 136 include one or more thresholds, the thresholds 142 may include static thresholds, and/or time-dependent thresholds. For example, a given entity may be busier (e.g., more individuals may enter the physical building associated with the entity per unit time) during certain periods of the day, and/or during certain days of the week. For instance, an entity such as a restaurant may be busier during the lunch hour than from 3:00-4:00 μm. In certain embodiments, one or more time-dependent thresholds that are used to trigger computing system 102 to send alerts 138 may be higher during busier periods. For instance, with respect to a trash can sensor 114*a*, the threshold for transmitting alert 138 to device 106 may be set at 50% remaining capacity during busy periods, and 25% remaining capacity during non-busy periods. Computing system 102 may identify busy periods in any suitable manner. For example, in certain embodiments, computing system 102 may automatically identify busy periods by monitoring the number of transactions that occur within the physical building associated with the entity over time. In some embodiments, computing system 102 may receive identifications of busy times from user 104.

Any number of different factors may be used to adjust one or more thresholds 142 included within rules 136. As a specific example consider a cup dispenser sensor 114*c* that is configured to measure property(s) from which a fill level of the cup dispenser may be determined. In certain embodiments, a rule 136*c* may include a time-dependent threshold that depends not only on the time of day but also on the type of beverage for which the cups housed within the cup dispenser are designed to hold. For instance, a convenience store may experience a busy period during weekday mornings, from 7:00 am-9:00 am, during which demand for coffee is high, but demand for frozen beverages is low. Accordingly, computing system 102 may set the fill level threshold for a coffee cup dispenser at a higher value than a frozen drink cup dispenser during this time period. As another example, in certain embodiments, computing system 102 may store, as part of rules 136, threshold information associated with multiple physical buildings. In such embodiments, computing system 102 may be configured to adjust one or more of the thresholds associated with a given physical building, based on changes made to the thresholds associated with another building. As a specific example, in certain embodiments, an entity may have recently begun operating within a new physical building. In such embodiments, computing system 102 may not have enough information from which to accurately identify busy periods within the building. The entity may, however, have also been operating in one or more nearby buildings (e.g., buildings that are within a given radius from the new building) for years. Accordingly, computing system 102 may use information from the one or more nearby buildings to identify likely busy periods for the new building. In particular, computing system 102 may set one or more time-dependent thresholds for use in the new building based on average values of the thresholds associated with the nearby building (s).

In certain embodiments, one or more thresholds 142 included within rules 136 may be adjustable by user 104. In some embodiments, whether user 104 may adjust a given threshold 142 may depend on a role of the user within the entity associated with the threshold. For example, in certain embodiments in which the entity is a convenience store and/or restaurant with multiple franchises, a franchisee 104 may be able to adjust one or more thresholds 142. As a specific example, a franchisee 104 may be able to adjust a threshold 142 associated with a trash can sensor, such that computing system 102 is configured to generate an alert 138 indicating that user 104 should empty the trash can, when the trash can is 70% full. As another specific example, a corporate director 104 may be able to adjust a threshold 142 associated with a coffee machine sensor, such that computing system 102 is configured to generate an alert 138 indicating that user 104 should refill the coffee beans within the coffee machine, when the fill level of the coffee beans falls to 15%. Once the corporate director has set the threshold 142, a franchisee 104 may not be able to change it. For example, computing system 102 may be configured to reject any attempts by a franchisee 104 to adjust the threshold 142 from a coffee bean fill level of 15% to a coffee bean fill level of 10%.

As described above, the set of rules 136 may also include rules that may be used by computing system 102 to prioritize alerts 138, when computing system 102 has determined that two or more alerts 138 should be transmitted to a given user device 106. In certain such embodiments, rules 136 may include a set of conditions that may depend on properties measured by two or more different types of sensors (or values derived from those measured properties). As a specific example, rule 136a may include a condition that depends on both a coffee bean fill level and a trash can fill level, and indicates that refilling the coffee beans within a coffee machine should be prioritized over emptying a trash can, if the sensor measurements 140 received for the coffee machine indicate low coffee bean levels (e.g., below 10%) and the sensor measurements 140 received for the trash can indicate moderately high trash can fill levels (e.g., greater than 75%). As another specific example, rule 136b may include a condition that depends on both a cup dispenser fill level and a coffee bean fill level, and indicates that refilling the cups within the cup dispenser should be prioritized over refilling the coffee beans within the coffee machine, if the sensor measurements 140 received for the coffee machine indicate medium coffee bean levels and the sensor measurements 140 received for the cup dispenser indicate low cup levels.

In certain embodiments the conditions stored within the set of rules 136 may be time dependent. As a specific example, rule 136c may include a condition that depends on both a fountain cup dispenser fill level and a coffee bean level for a coffee machine, and indicates that refilling the coffee beans within the coffee machine should be prioritized over refilling the fountain cups within the fountain cup dispenser, if the sensor measurements 140 are received between 7:00 am and 9:00 am and the sensor measurements 140 indicate medium coffee bean levels and low fountain cup levels. On the other hand, the condition may indicate the opposite—that refilling the fountain cups within the fountain cup dispenser should be prioritized over refilling the coffee beans within the coffee machine, if the sensor measurements 140 indicating medium coffee bean levels and low fountain cup levels are received between 12:00 μm and 1:00 μm.

In certain embodiments, computing system 102 may be configured to automatically generate time dependent conditions for use within rules 136. For example, in certain embodiments, computing system 102 may generate such time dependent conditions based on the transactions occurring within the physical building. In particular, during times at which a greater number of transactions are made for a first product than a second product, computing system 102 may be configured to generate a condition for that time period that prioritizes maintenance of equipment associated with the first product over maintenance of equipment associated with the second product.

Computing device may be configured to store the measured properties 140 received from sensors 114 and/or quantities derived from the measured properties 140 as historical values 126 in database 124. Database 124 is any suitable data storage location configured to store historical values of properties 126. For instance, database 124 may correspond to a relational database, a non-relational database, a server, a cloud-based storage system, a hard drive, and/or any other suitable storage device.

Modifications, additions, or omissions may be made to the systems described herein without departing from the scope of the invention. For example, system 100 may include any number of existing users 104, devices 106, networks 112, sensors 114, sensor processors 116, sensor memories 118, sensor radios 120, gateways 122, databases 124, historical values 126, processors 128, memories 130, sensor identifiers 132, device identifiers 134, and/or rules 136. The components may be integrated or separated. Moreover, the operations may be performed by more, fewer, or other components. Additionally, the operations may be performed using any suitable logic comprising software, hardware, and/or other logic.

II. Method for Automatically Identifying and Prioritizing Maintenance Issues within a Physical Building FIG. 2 illustrates an example method 200 (described in conjunction with elements of FIG. 1) for automatically identifying and prioritizing maintenance issues associated with equipment located in a physical store, based on measurements of properties associated with the equipment made by sensors 114.

During operation 202, the system uses a first sensor 114a to measure a value 140 of a property of a first piece of equipment. Sensor 114a then transmits this value 140 to computing device 102. During operation 204, computing system 102 determines, based on the value 140 of the property of the first piece of equipment, whether a first condition 136a is satisfied. First condition 136a may be any suitable condition that depends on the property of the first piece of equipment. As an example, first condition 136a may correspond to a condition that is satisfied if the value of the property of the first piece of equipment (e.g., fill level of a cup dispenser) is less than a first threshold 142. If, during operation 204 computing system 102 determines that first condition 136a is satisfied (e.g., the fill level of the cup dispenser is less than the first threshold 142), during operation 206 computing system 102 generates a first alert 138 (e.g., an alert indicating that the fill level of the cup dispenser has fallen below the first threshold 142). Method 200 then proceeds to operation 208.

If, during operation 204 computing system 102 determines that first condition 136a is not satisfied (e.g., the fill level of the cup dispenser is greater than the first threshold 142), method 200 proceeds directly to operation 208. During operation 208, the system uses a second sensor 114b to measure a value 130 of a property of a second piece of equipment. Sensor 114b then transmits this value 140 to computing device 102. During operation 210, computing system 102 determines, based on the value 140 of the property of the second piece of equipment, whether a second condition 136b is satisfied. Second condition 136b may be any suitable condition that depends on the value 140 of the property of the second piece of equipment. As an example, second condition 136b may correspond to a condition that is satisfied if the value of the property of the second piece of equipment (e.g., trash can fill level) is greater than a second threshold 142. If, during operation 210 computing system 102 determines that second condition 136b is satisfied (e.g., the fill level of the trash can is greater than a second threshold 142), during operation 212 computing system 102 generates a second alert 138 (e.g., an alert indicating that the fill level of the trash can is above a desired threshold 142).

During operation 214, computing system 102 determines, based on both the value of the property of the first piece of equipment and the value of the property of the second piece of equipment, whether a third condition 136c is satisfied. Third condition 136c may be any suitable condition that depends on the value of the property of the first piece of equipment and the value of the property of the second piece of equipment. As an example, third condition 136c may correspond to a condition that is satisfied if the value of the property of the first piece of equipment (e.g., fill level of a cup dispenser) is between a lower bound and an upper bound, and the value of the property of the second piece of equipment (e.g., trash can fill level) is greater than a third threshold. If, during operation 214 computing system 102 determines that this third condition 136c is satisfied (e.g., the fill level of the cup dispenser is between the lower bound and the upper bound and the trash can fill level is greater than the third threshold), during operation 216 computing system 102 determines whether both the value 140 of the property of the first piece of equipment and the value 140 of the property of the second piece of equipment were measured by sensors 114a and 114b during a given time period. If, during operation 216 computing system 102 determines that both the value 140 of the property of the first piece of equipment and the value 140 of the property of the second piece of equipment were measured by sensors 114a and 114b during the given time period, during operation 218 computing system 102 prioritizes the first alert 138 over the second alert 138. Otherwise, during operation 222, computing system 102 prioritizes the second alert over the first alert.

On the other hand, if, during operation 214 computing system 102 determines that the third condition 136c is not satisfied (e.g., the fill level of the cup dispenser is not between the lower bound and the upper bound and/or the trash can fill level is not greater than the third threshold), during operation 220 computing system 102 determines whether both the value 140 of the property of the first piece of equipment and the value 140 of the property of the second piece of equipment were measured by sensors 114a and 114b during a given time period. If, during operation 220 computing system 102 determines that the value 140 of the property of the first piece of equipment was not measured by sensor 114a during the given time period and/or that the value 140 of the property of the second piece of equipment was not measured by sensor 114b during the given time period, during operation 218 computing system 102 prioritizes the first alert 138 over the second alert 138. Otherwise, during operation 222, computing system 102 prioritizes the second alert over the first alert.

Modifications, additions, or omissions may be made to the methods described herein without departing from the scope of the disclosure. The methods may include more, fewer, or other operations. Additionally, operations may be performed in any suitable order. That is, the operations of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
   a plurality of sensors located within a store, the store comprising a set of equipment, the plurality of sensors comprising:
      a first sensor associated with a first piece of equipment of the set of equipment, the first sensor configured to:
         measure a first property of the first piece of equipment, wherein the first property comprises a sound generated by the first piece of equipment, a distance to the first piece of equipment, or a pressure applied to the first piece of equipment; and
         transmit the measured first property over a network; and
      a second sensor associated with a second piece of equipment of the set of equipment, the second sensor configured to:
         measure a second property of the second piece of equipment, wherein the second property comprises a sound generated by the second piece of equipment, a distance to the second piece of equipment, or a pressure applied to the second piece of equipment; and
         transmit the measured second property over the network; and
   a computing system communicatively coupled to the plurality of sensors, the computing system comprising:
      a memory configured to store a plurality of conditions, each condition associated with at least one piece of equipment of the set of equipment, each condition associated with one or more respective thresholds against which at least one of the measured first property and the measured second property is to be compared, the plurality of conditions comprising:
         a first condition that depends on the first property of the first piece of equipment, wherein satisfaction of the first condition indicates that maintenance of the first piece of equipment is to be requested;

a second condition that depends on the second property of the second piece of equipment, wherein satisfaction of the second condition indicates that maintenance of the second piece of equipment is to be requested; and a third condition that depends on both the first property of the first piece of equipment and the second property of the second piece of equipment, wherein satisfaction of the third condition indicates that maintenance of the first piece of equipment is to be prioritized over maintenance of the second piece of equipment; and a hardware processor communicatively coupled to the memory, the hardware processor configured to:
receive the measured first property from the network;
determine, based on the measured first property, that the first condition is satisfied;
receive the measured second property from the network;
determine, based on the measured second property, that the second condition is satisfied;
and in response to determining that the first condition is satisfied and that the second condition is satisfied:
determine, based on the measured first property and the measured second property, that the third condition is satisfied; and
in response to determining that the third condition is satisfied:
transmit an alert for display on a user device, the alert requesting maintenance of the first piece of equipment and the second piece of equipment, and indicating that maintenance of the first piece of equipment has a higher priority than maintenance of the second piece of equipment.

2. The system of claim 1, wherein the network comprises a local network and an external network, the system further comprising a gateway communicatively coupled to the first sensor and the second sensor, the gateway configured to:
receive, over the local network, the measured first property and the measured second property; and
transmit, over the external network, the measured first property and the measured second property, wherein the hardware processor is configured to receive the measured first property and the measured second property from the external network.

3. The system of claim 1, wherein:
the third condition is time dependent, such that:
satisfaction of the third condition during a first period of time during a day indicates that maintenance of the first piece of equipment is to be prioritized over maintenance of the second piece of equipment; and
satisfaction of the third condition during a second period of time during the day different from the first period of time during the day indicates that maintenance of the second piece of equipment is to be prioritized over maintenance of the first piece of equipment; and
transmitting the alert indicating that maintenance of the first piece of equipment has the higher priority than maintenance of the second piece of equipment is further performed in response to determining that the measured first property and the measured second property were received during the first period of time during the day.

4. The system of claim 1, wherein:
determining, based on the measured first property, that the first condition is satisfied comprises determining that the measured first property is greater than a threshold value; and
the hardware processor is further configured to:
receive a new threshold value; and
replace the threshold value with the new threshold.

5. The system of claim 1, wherein:
the plurality of sensors further comprises a third sensor associated with a third piece of equipment of the set of equipment, the third sensor configured to:
measure a third property of the third piece of equipment; and
transmit the measured third property over the network;
the plurality of conditions further comprises a fourth condition that depends on the third property of the third piece of equipment, wherein satisfaction of the fourth condition indicates that maintenance of the third piece of equipment is to be requested; and
the hardware processor is further configured to:
receive the measured third property from the network;
determine, based on the measured third property, that the fourth condition is satisfied; and
in response to determining that the fourth condition is satisfied, generate a service ticket for the third piece of equipment.

6. The system of claim 1, further comprising a database configured to store historical values of the first property, wherein the hardware processor is further configured to:
in response to receiving the measured first property, store the measured first property as a historical value of the first property within the database; and
transmit the historical values of the first property for display on the user device.

7. The system of claim 1, wherein:
the memory is further configured to store:
a plurality of store identifiers; and
a plurality of device identifiers, each store identifier associated with one or more device identifiers, each device identifier associated with a device of a plurality of devices;
the first sensor is located within a first building associated with a first store identifier of the plurality of store identifiers, wherein the first sensor is further configured to transmit the first store identifier over the network;
the hardware processor is further configured to:
receive the first store identifier from the first sensor over the network; and
determine, based on the received first store identifier, a first device identifier of the plurality of device identifiers associated with the first store identifier, wherein the user device to which the alert was transmitted is associated with the first device identifier.

8. A method comprising:
receiving, from a first sensor of a plurality of sensors located within a store, a measured value of a property of a first piece of equipment of a set of equipment located within the store, wherein the property of the first piece of equipment comprises a sound generated by the first piece of equipment, a distance to the first piece of equipment, or a pressure applied to the first piece of equipment;
receiving, from a second sensor of the plurality of sensors, a measured value of a property of a second piece of equipment of the set of equipment, wherein the property of the second piece of equipment comprises a sound generated by the second piece of equipment, a distance to the second piece of equipment, or a pressure applied to the second piece of equipment;

determining, based on the measured value of the property of the first piece of equipment, that a first condition is satisfied, the first condition dependent on the property of the first piece of equipment, the first condition associated with a respective threshold against which the property of the first piece of equipment is to be compared, wherein satisfaction of the first condition indicates that maintenance of the first piece of equipment is to be requested;

determining, based on the measured value of the property of the second piece of equipment, that a second condition is satisfied, the second condition dependent on the property of the second piece of equipment, the second condition associated with a respective threshold against which the property of the second piece of equipment is to be compared, wherein satisfaction of the second condition indicates that maintenance of the second piece of equipment is to be requested; and in response to determining that the first condition is satisfied and that the second condition is satisfied:

determining, based on the measured value of the property of the first piece of equipment and the measured value of the property of the second piece of equipment, that a third condition is satisfied, the third condition dependent on both the property of the first piece of equipment and the property of the second piece of equipment, the third condition associated with respective thresholds against which the property of the first piece of equipment and the property of the second piece of equipment is to be compared, wherein satisfaction of the third condition indicates that maintenance of the first piece of equipment is to be prioritized over maintenance of the second piece of equipment; and in response to determining that the third condition is satisfied, transmitting an alert for display on a user device, the alert requesting maintenance of the first piece of equipment and the second piece of equipment, and indicating that maintenance of the first piece of equipment has a higher priority than maintenance of the second piece of equipment.

9. The method of claim 8, wherein receiving the measured value of the property of the first piece of equipment and the measured property of the second piece of equipment comprises receiving, from a gateway, the measured values over an external network, wherein the gateway received the measured value of the property of the first piece of equipment from the first sensor over a local network, and the gateway received the measured value of the property of the second piece of equipment from the second sensor over the local network.

10. The method of claim 8, wherein:
the third condition is time dependent, such that:
satisfaction of the third condition during a first period of time during a day indicates that maintenance of the first piece of equipment is to be prioritized over maintenance of the second piece of equipment; and
satisfaction of the third condition during a second period of time during the day different from the first period of time during the day indicates that maintenance of the second piece of equipment is to be prioritized over maintenance of the first piece of equipment; and transmitting the alert indicating that maintenance of the first piece of equipment has the higher priority than maintenance of the second piece of equipment is further performed in response to determining that the measured first property and the measured second property were received during the first period of time during the day.

11. The method of claim 8, wherein:
determining, based on the measured first property, that the first condition is satisfied comprises determining that the measured first property is greater than a threshold value; and
the method further comprises:
receiving a new threshold value; and
replacing the threshold value with the new threshold.

12. The method of claim 8, further comprising:
receiving, from a third sensor of the plurality of sensors, a measured value of a property of a third piece of equipment of the set of equipment;
determining, based on the measured value of the property of the third piece of equipment, that a fourth condition is satisfied, the fourth condition dependent on the property of the third piece of equipment, wherein satisfaction of the fourth condition indicates that maintenance of the third piece of equipment is to be requested; and
in response to determining that the fourth condition is satisfied, generating a service ticket for the third piece of equipment.

13. The method of claim 8, further comprising:
in response to receiving the measured first property, storing the measured first property as a historical value of the first property within a database configured to store historical values of the first property; and
transmitting the historical values of the first property for display on the user device.

14. The method of claim 8, further comprising:
receiving a first store identifier from the first sensor; and
determining, based on the received first store identifier, a first device identifier, wherein:
the first device identifier is stored in a memory as associated with the first store identifier; and
transmitting the alert for display on the user device, is further performed in response to determining that the first device identifier is associated with the user device.

15. A non-transitory computer-readable medium comprising instructions that, when executed by a hardware processor, cause the processor to:
receive, from a first sensor of a plurality of sensors located within a store, a measured value of a property of a first piece of equipment of a set of equipment located within the store, wherein the property of the first piece of equipment comprises a sound generated by the first piece of equipment, a distance to the first piece of equipment, or a pressure applied to the first piece of equipment;
receive, from a second sensor of the plurality of sensors, a measured value of a property of a second piece of equipment of the set of equipment, wherein the property of the second piece of equipment comprises a sound generated by the second piece of equipment, a distance to the second piece of equipment, or a pressure applied to the second piece of equipment;
determine, based on the measured value of the property of the first piece of equipment, that a first condition is satisfied, the first condition dependent on the property of the first piece of equipment, the first condition associated with a respective threshold against which the property of the first piece of equipment is to be compared, wherein satisfaction of the first condition indicates that maintenance of the first piece of equipment is to be requested;

determine, based on the measured value of the property of the second piece of equipment, that a second condition is satisfied, the second condition dependent on the property of the second piece of equipment, the second condition associated with a respective threshold against which the property of the second piece of equipment is to be compared, wherein satisfaction of the second condition indicates that maintenance of the second piece of equipment is to be requested; and in response to determining that the first condition is satisfied and that the second condition is satisfied:
determine, based on the measured value of the property of the first piece of equipment and the measured value of the property of the second piece of equipment, that a third condition is satisfied, the third condition dependent on both the property of the first piece of equipment and the property of the second piece of equipment, the third condition associated with respective thresholds against which the property of the first piece of equipment and the property of the second piece of equipment is to be compared, wherein satisfaction of the third condition indicates that maintenance of the first piece of equipment is to be prioritized over maintenance of the second piece of equipment; and in response to determining that the third condition is satisfied, transmit an alert for display on a user device, the alert requesting maintenance of the first piece of equipment and the second piece of equipment, and indicating that maintenance of the first piece of equipment has a higher priority than maintenance of the second piece of equipment.

16. The non-transitory computer-readable medium of claim 15, wherein receiving the measured value of the property of the first piece of equipment and the measured property of the second piece of equipment comprises receiving, from a gateway, the measured values over an external network, wherein the gateway received the measured value of the property of the first piece of equipment from the first sensor over a local network, and the gateway received the measured value of the property of the second piece of equipment from the second sensor over the local network.

17. The non-transitory computer-readable medium of claim 15, wherein:

the third condition is time dependent, such that:
satisfaction of the third condition during a first period of time during a day indicates that maintenance of the first piece of equipment is to be prioritized over maintenance of the second piece of equipment; and
satisfaction of the third condition during a second period of time during the day different from the first period of time during the day indicates that maintenance of the second piece of equipment is to be prioritized over maintenance of the first piece of equipment; and
transmitting the alert indicating that maintenance of the first piece of equipment has the higher priority than maintenance of the second piece of equipment is further performed in response to determining that the measured first property and the measured second property were received during the first period of time during the day.

18. The non-transitory computer-readable medium of claim 15, wherein:
determining, based on the measured first property, that the first condition is satisfied comprises determining that the measured first property is greater than a threshold value; and
the instructions, when executed by the hardware processor, further cause the processor to:
receive a new threshold value; and
replace the threshold value with the new threshold.

19. The non-transitory computer-readable medium of claim 15, wherein the instructions, when executed by the hardware processor, further cause the processor to:
receive, from a third sensor of the plurality of sensors, a measured value of a property of a third piece of equipment of the set of equipment;
determine, based on the measured value of the property of the third piece of equipment, that a fourth condition is satisfied, the fourth condition dependent on the property of the third piece of equipment, wherein satisfaction of the fourth condition indicates that maintenance of the third piece of equipment is to be requested; and
in response to determining that the fourth condition is satisfied, generate a service ticket for the third piece of equipment.

20. The non-transitory computer-readable medium of claim 15, wherein the instructions, when executed by the hardware processor, further cause the processor to:
in response to receiving the measured first property, store the measured first property as a historical value of the first property within a database configured to store historical values of the first property; and
transmit the historical values of the first property for display on the user device.

* * * * *